Figure 5:
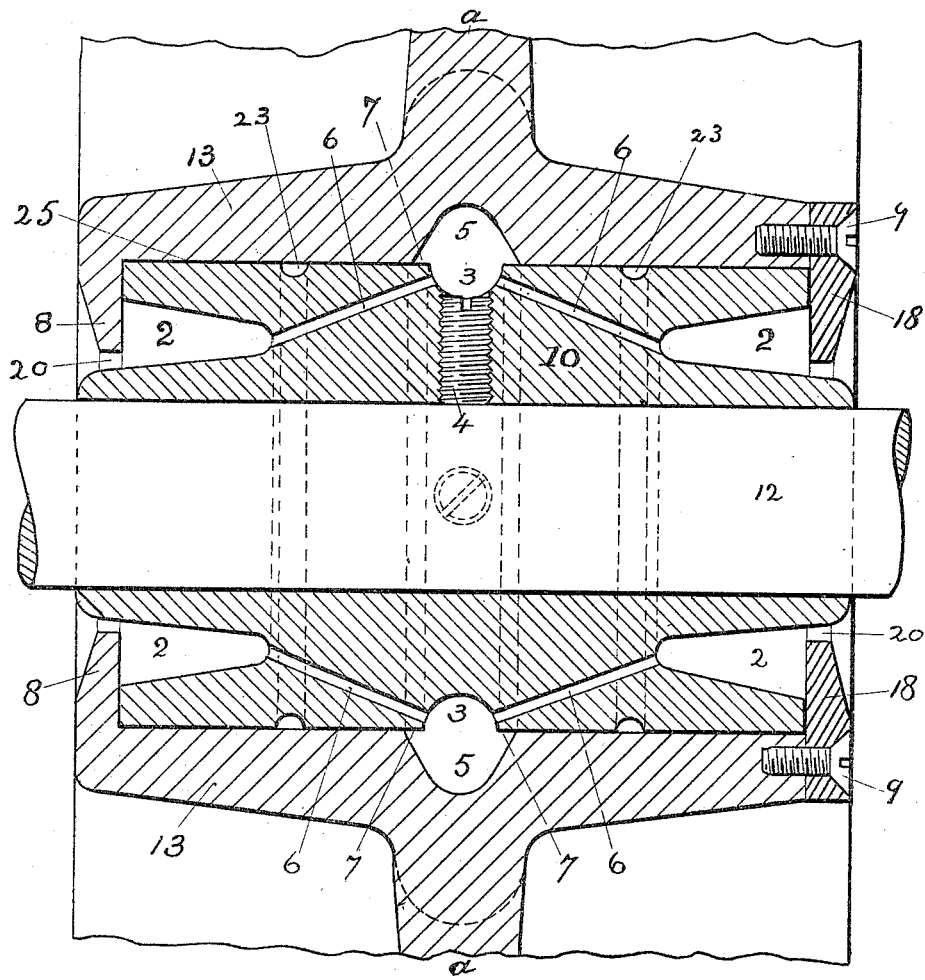

No. 821,632. PATENTED MAY 29, 1906.
L. O. GOODWIN.
SELF LUBRICATING LOOSE PULLEY.
APPLICATION FILED FEB. 19, 1906.
2 SHEETS—SHEET 1.
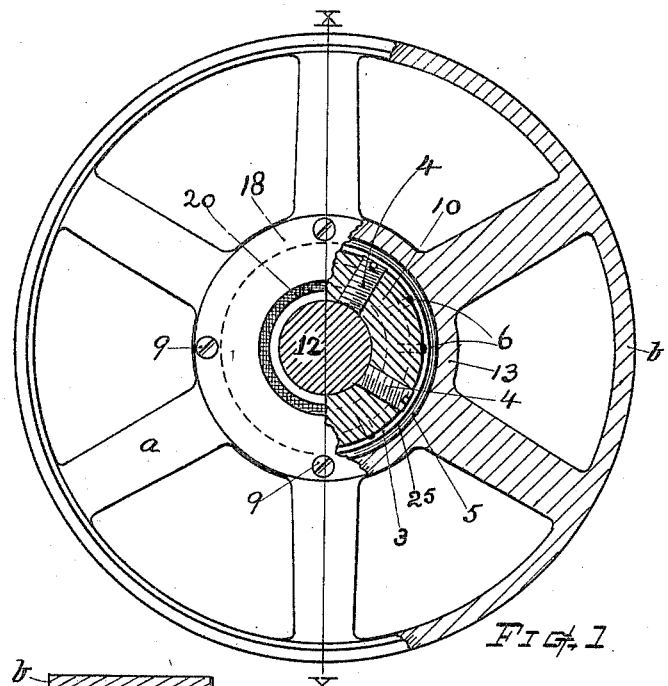
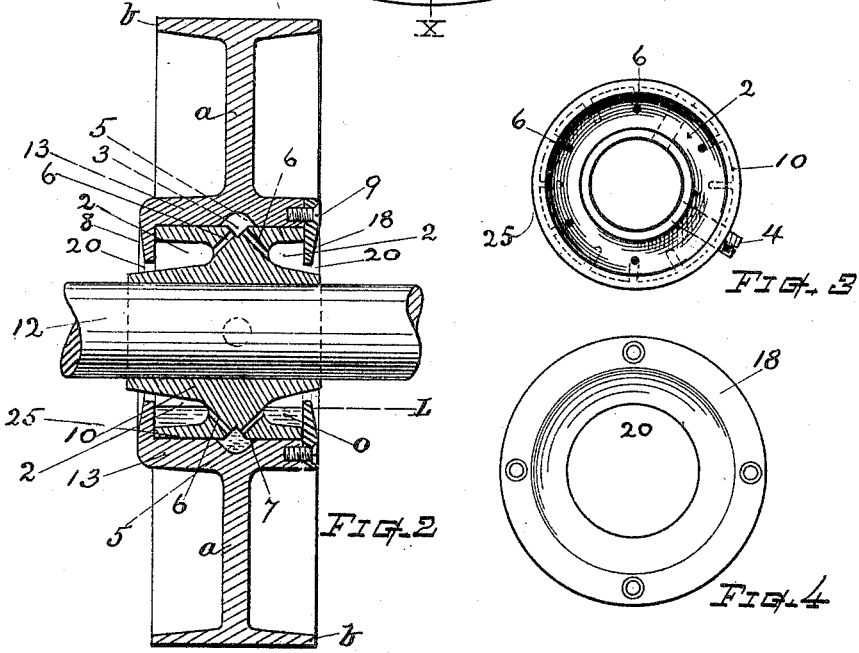
Witnesses.
Inventor.
Lyman O. Goodwin
By Chas. H. Burleigh
Attorney

UNITED STATES PATENT OFFICE.

LYMAN O. GOODWIN, OF WORCESTER, MASSACHUSETTS, ASSIGNOR OF ONE-HALF TO JOSEPH M. BASSETT AND GEORGE M. BASSETT, OF WORCESTER, MASSACHUSETTS, A FIRM.

SELF-LUBRICATING LOOSE PULLEY.

No. 821,632.     Specification of Letters Patent.     Patented May 29, 1906.

Application filed February 19, 1906. Serial No. 301,729.

*To all whom it may concern:*

Be it known that I, LYMAN O. GOODWIN, a citizen of the United States, residing at Worcester, in the county of Worcester and State of Massachusetts, have invented a new and useful Self-Lubricating Loose Pulley, of which the following is a specification, reference being made therein to the accompanying drawings.

The object of my present invention is to provide an efficient and durable self-lubricating loose pulley embodying features of construction as illustrated and more fully hereinafter explained.

In the drawings, Figure 1 is a side view, partly in section, showing my invention. Fig. 2 is a section at line X X on Fig. 1. Fig. 3 is an end view of the inner hub. Fig. 4 is a face view of the attached flange. Fig. 5 is a section view showing the pulley-hub as made for large-size pulleys.

In my invention I provide the pulley with a central structure comprising a cylindrical inner hub member, (indicated by the numeral 10,) which is secured fast upon the shaft 12, and an outer hub member 13, having the arms *a* and rim *b* of the wheel or pulley formed thereon, said outer hub being arranged to run loose upon the inner hub.

The inner hub is formed with annular open chambers 2 in its ends concentric with the axis and each extending inward about one-third, more or less, of the length of the hub. The periphery of said cylindrical inner hub is provided with a central circumferential groove or channel 3, extending completely around it. The inner hub is made secure upon the shaft by means of set-screws 4, which are arranged radially with their heads or outer ends within the groove and below the bearing-circumference of the hub. A series of radial or inclined oil-passages 6 extend up from the inner ends of the chambers 2 into the groove 3, said passages disposed about the circle, preferably with the passages from the right-hand chamber and left-hand chamber arranged in alternate order.

The outer hub is provided with an internal circular groove or channel 5 in a line coincident with channel 3 of the inner hub, said groove 5 being preferably of greater width than the channel 3, thus leaving a portion of the inner hub-periphery, as ledge 7, at either side of said channel. The ends of the outer hub are provided with inwardly-projecting flanges 8 and 18, one of which may be formed integral upon the outer hub, while the other, 18, is closely fitted to the end thereof and secured thereto by screws 9 or in other efficient manner.

The central opening 20 of the flanges is made of less diameter than the outer circle of the chambers 2, but leaving a small space between the inner edge of the flange and the body portion of the inner hub, which rests upon the shaft. The flanges bear against the respective ends of that portion of the inner hub which surrounds the chambers 2 with a comparatively close but a running fit and serve to arrest the outflow of oil at the ends of the hub.

The oil O is introduced into the chambers 2 through the end openings 20 in the flanges, and when the pulley is at rest it settles in the lower part and is retained by the flanges up to the level of their circle, more or less, as indicated by the line L on Fig. 2. When the pulley is in motion, the oil flows out through the passages 6 into the channels or grooves 3 and 5 and from thence works its way between the wearing-surfaces 25, giving ample lubrication and keeping the loose-running pulley thoroughly oiled at all times. The ledges 7 greatly assist in the spread of the oil to the surfaces 25.

In the case of large-size pulleys I preferably form additional grooves 23 about the periphery of the inner hub 10, as indicated in Fig. 5, which grooves assist in retaining the oil for the bearing-surfaces; but in small-size pulleys such additional grooves may be omitted.

By providing the inner hub 10, fixed on the shaft 12, and the outer hub 13, revolving about the inner hub, the wear is uniformly distributed and the pulley is not liable to be worn irregular or to become wabbly on the shaft; neither can it cut or wear into the side shaft by the running of the pulley when the shaft is idle. The inclined channels 6 serve to feed the lubricant to the center of the bearing-surfaces in ample quantity, and as the wearing-surface is of greater area than in the ordinary loose pulley the mechanism is rendered more durable. The grooves in the hub being all turned or finished surfaces afford no rough or cast faces to collect dirt or grit which might work in between the bearing-surfaces and increase the wear. The parts 10 and 13 may be of different kinds of metal, and such parts can be readily and economically made, are simple and convenient for assembling, and can be quickly taken apart by removal of the detachable flange 18 and slipping the outer hub endwise from the inner hub member.

What I claim, and desire to secure by Letters Patent, is—

1. A self-lubricating loose pulley comprising an inner hub provided with annular end chambers, and passages leading therefrom to a central groove about its peripheral surface, means for securing said inner hub rigidly upon a shaft, an outer hub carrying the pulley rim or wheel and fitted to run loose upon the periphery of said inner hub and having a circular interior groove coincident with the groove of the inner hub, said outer hub provided with inwardly-projecting annular flanges adjacent to the ends of the inner hub and inclosing the outer portion of the chamber-openings, substantially as set forth.

2. In a self-lubricating loose pulley, the combination with the shaft, of the cylindrical annularly-chambered inner hub having inclined oil-passages from the inner ends of its chambers to the central circumference of said hub, set-screws disposed in the body thereof between said chambers for securing the hub to the shaft, an outer hub mounted to run loose upon said inner hub and having the pulley rim or wheel formed thereon, said outer hub provided with an internal circumferential groove with which said oil-passages communicate, there being inward annular guard-flanges on the ends of said hub, one of which flanges is removable, and means for securing said removable flange to the end of the hub.

3. A self-lubricating pulley comprising a cylindrical inner hub having a circumferential channel about its periphery, oil-chambers within its ends with outwardly-inclined passages leading therefrom into said channel, means for securing said inner hub upon a shaft, an outer hub integral with the pulley rim or wheel mounted to turn upon said inner hub and having an internal channel oppositely coincident with but of greater width than the channel of the inner hub, thereby affording plain ledges of the cylindrical surface of the inner hub at each side of said channel, and means at the ends of said hubs for arresting the outflow of oil when the pulley is idle, substantially as set forth.

Witness my hand this 16th day of February, 1906.

LYMAN O. GOODWIN.

Witnesses:
CHAS. H. BURLEIGH,
CHARLES S. BACON.